(12) United States Patent
Tanaka et al.

(10) Patent No.: US 7,702,195 B2
(45) Date of Patent: Apr. 20, 2010

(54) OPTICAL WAVEGUIDE

(75) Inventors: Kazuo Tanaka, Gifu-Ken (JP);
Masahiro Tanaka, Gifu-ken (JP)

(73) Assignee: Gifu Univeristy, Gifu-ken (JP)

( * ) Notice: Subject to any disclaimer, the term of this patent is extended or adjusted under 35 U.S.C. 154(b) by 693 days.

(21) Appl. No.: 11/570,410

(22) PCT Filed: Jun. 10, 2005

(86) PCT No.: PCT/JP2005/010641
§ 371 (c)(1),
(2), (4) Date: Dec. 11, 2006

(87) PCT Pub. No.: WO2005/121748
PCT Pub. Date: Dec. 22, 2005

(65) Prior Publication Data
US 2009/0202190 A1    Aug. 13, 2009

(30) Foreign Application Priority Data
Jun. 11, 2004    (JP)    ............... 2004-173884

(51) Int. Cl.
*G02B 6/26*    (2006.01)
*G02B 6/00*    (2006.01)

(52) U.S. Cl. ............... 385/31; 385/39; 385/122; 977/862

(58) Field of Classification Search ............... None
See application file for complete search history.

(56) References Cited

U.S. PATENT DOCUMENTS
7,312,445 B2 * 12/2007 Lapchuk et al. ............. 250/306
(Continued)

FOREIGN PATENT DOCUMENTS
JP    2002-221478    8/2002
(Continued)

OTHER PUBLICATIONS
Tanaka et al.; "Simulation of Near-Field Optics: An Aperture in the Thick Metallic Screen That Gives Large-Intensity and Small Spot Size Using Surface Plasmon Polariton", The Papers of Technical Meeting on Electromagnetic Theory, IEE Japan (Oct. 23, 2002); pp. 69-74.
(Continued)

*Primary Examiner*—Omar Rojas
(74) *Attorney, Agent, or Firm*—Marsh Fischmann & Breyfogle LLP (57) ABSTRACT

When light is made incident to an optical waveguide path 14 formed through a main body 12 composed of silver (Ag) that is a plasmon active medium, surface plasmon is generated on a definition face 55 of the optical waveguide path 14 (including a fine aperture 16). Thus, the intensity of the light propagating in the optical waveguide path 14 is strengthened as the light propagates toward the fine aperture 16. In addition, a distal end 51 of a first protrusive piece 13*a* is more protrusive as compared with a distal end 52 of a second protrusive piece 13*b*. Thus, in a distal end part of a projection 13, the light is focused in the vicinity of the first protrusive piece 13*a* based on an intensity distribution of an electric field at the distal end part. Thus, the light having seeped out from the fine aperture 16 is restricted from spreading in a polarizing direction. Therefore, the light intensity of the light propagated through the optical waveguide path 14 is increased at a low cost without causing an increase of the spread of the light while maintaining a good S/N ratio.

9 Claims, 8 Drawing Sheets

U.S. PATENT DOCUMENTS

2004/0062477 A1*   4/2004   Tanaka et al. ................. 385/31
2004/0085862 A1    5/2004   Matsumoto et al.

FOREIGN PATENT DOCUMENTS

JP    2004-109965    4/2004
JP    2004-151046    5/2004

OTHER PUBLICATIONS

Tanaka et al.; "Analysis and Numerical Computation of Diffraction of an Optical Field by a Subwavelength-size Aperture in a Thick Metallic Screen by Use of a Volume Integral Equation"; Applied Optics, vol. 43, No. 8 (Mar. 10, 2004); pp. 1734-1746.

* cited by examiner

OPTICAL WAVEGUIDE

FIELD OF THE INVENTION

The present invention relates to an optical waveguide suitable for use, for example, in a scanning near-field optical microscope or an optical information recording apparatus.

BACKGROUND OF THE INVENTION

In recent years, as a technique enabling optical processing in a region that is smaller than a wavelength of a light (visible light: 0.4 microns to 0.8 microns), attention has been focused on a technique of utilizing a near-field light (light arriving at only a region with a distance shorter than a wavelength of light). For example, in the field of a scanning near-field optical microscope, an optical probe having a fine aperture that is smaller than a wavelength of light at a distal end of the probe, as described in Patent Document 1, is used as an optical waveguide. In addition, at the time of observing a small region of a sample surface, a fine aperture of the optical probe is disposed in proximity to the small region targeted for observation so as to bring an optical field (near-field) that seeps out in the vicinity of the surface of the fine aperture into contact with the sample surface.

Then, only the small region of the sample surface coupled with this near field is irradiated with the light (near-field light), and then, reflected light, scattering light, or transmitted light from the sample due to that irradiation is detected, thereby locally observing and evaluating the small region. Therefore, with respect to such an optical probe that is a type of optical waveguide, a variety of optical probes have been conventionally proposed as optical waveguides in order to contribute to a request for downsizing a recording bit in an optical recording medium such as CDs, for example, or evaluation or the like of a semiconductor manufacturing process for carrying out a fine processing on the order of sub-microns.

Incidentally, like the optical probe described in Patent Document 1, an optical probe which forms a fine aperture at the distal end of the probe, irradiates a sample surface through the fine aperture, and detects a reflected light or the like through the fine aperture is referred to as an aperture probe. On the other hand, an optical probe which forms a distal end of the probe as a sharp end having a significantly small radius of curvature like a metal needle and detects scattering light by means of another detection optical probe produced at the time of inserting the end of the probe into a near-field optical region generated by irradiating the sample surface under a full reflection condition is referred to as an apertureless probe.

In the meantime, the fine aperture of an aperture probe is smaller than a wavelength of light, and thus, the light intensity of the near-field light is unavoidably very weak. For example, in the case of an illumination mode in which irradiation of the near-field light and a focusing of the light obtained from a sample are carried out through the same aperture, the light intensity of the near-field light that seeps out from the fine aperture of the aperture probe becomes very weak, i.e., on the order of about 1/1000 of the light intensity of the light introduced into the aperture probe. Therefore, for example, at the time of high speed writing or readout in an optical information recording apparatus or the like, a problem such as an insufficient amount of light may occur. Thus, at the time of practically using the aperture probe, there is a need for increasing the light intensity of the near-field light that seeps out from the fine aperture.

However, if a light source is strengthened in order to increase the light intensity of the near-field light, cost is increased. On the other hand, if the distal end aperture is increased, the spread of the light that seeps out from this aperture increases, resulting in the lowered resolution. Namely, in any case, a problem with use of the aperture probe cannot be properly avoided. On the other hand, the resolution (resolving power) of an apertureless probe can be improved more remarkably than that of an aperture probe. However, if the distal end of the apertureless probe is actually inserted into the near-field optical region, the scattering light occurs not only at the distal end of the probe, but also at a portion other than the distal end of the probe. Therefore, an S/N ratio (Signal/Noise Ratio) of the apertureless probe is worsened than that of the aperture probe, and the detection sensitivity may be lowered. Further, when using the apertureless probe, and a detection optical probe must be further provided, resulting in high cost.

[Patent Document 1] Japanese Laid-Open Patent Publication No. 2002-221478

SUMMARY OF THE INVENTION

It is an objective of the present invention to provide an optical waveguide path capable of increasing the light intensity of the light propagated via an optical waveguide at a low cost without causing an increase of the spread of the light while maintaining a good S/N ratio.

In order to achieve the above described object, the present invention provides an optical waveguide. The waveguide is equipped with a main body having an optical waveguide path capable of propagating light having a predetermined wavelength along a first direction. The first direction is orthogonal to a second direction and a third direction that are orthogonal to each other. The light is polarized in the second direction. The optical waveguide path has an outlet allowing light to escape. The outlet has a narrow portion at which a width along the second direction is smaller than a wavelength of the light. A definition face for defining the optical waveguide path includes a pair of opposite face portions opposed to each other in the second direction. These opposite face portions are formed of a plasmon active substance at a portion that corresponds to at least the narrow portion. A projection formed in a substantially pyramidal or conical shape is provided at the main body. The outlet opens up in the projection such that at least a part of the narrow portion at a distal end of the projection. The outlet has a pair of aperture edges opposed to each other in the second direction. These aperture edges are shifted by a distance that is shorter than a wavelength of the light with respect to the first direction at a section corresponding to a distal end of the projection.

DETAILED DESCRIPTION OF THE PREFERRED EMBODIMENTS

Figure 1:
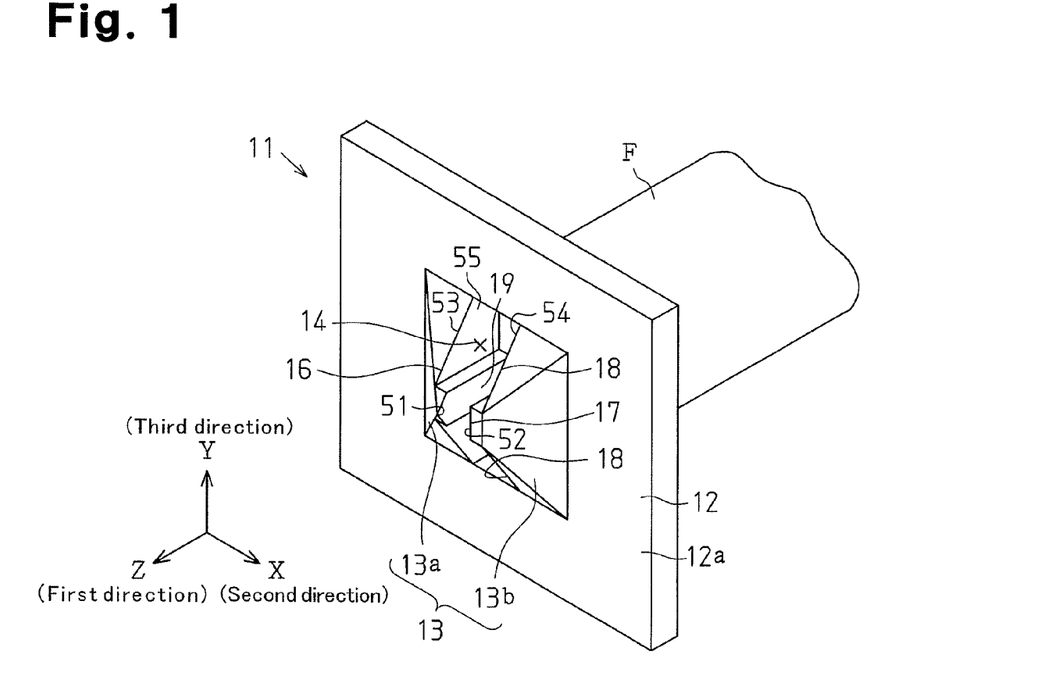
FIG. 1 is a perspective view showing a state in which an optical fiber is connected to an optical probe, which is an optical waveguide according to a first embodiment of the present invention.
Figure 2:
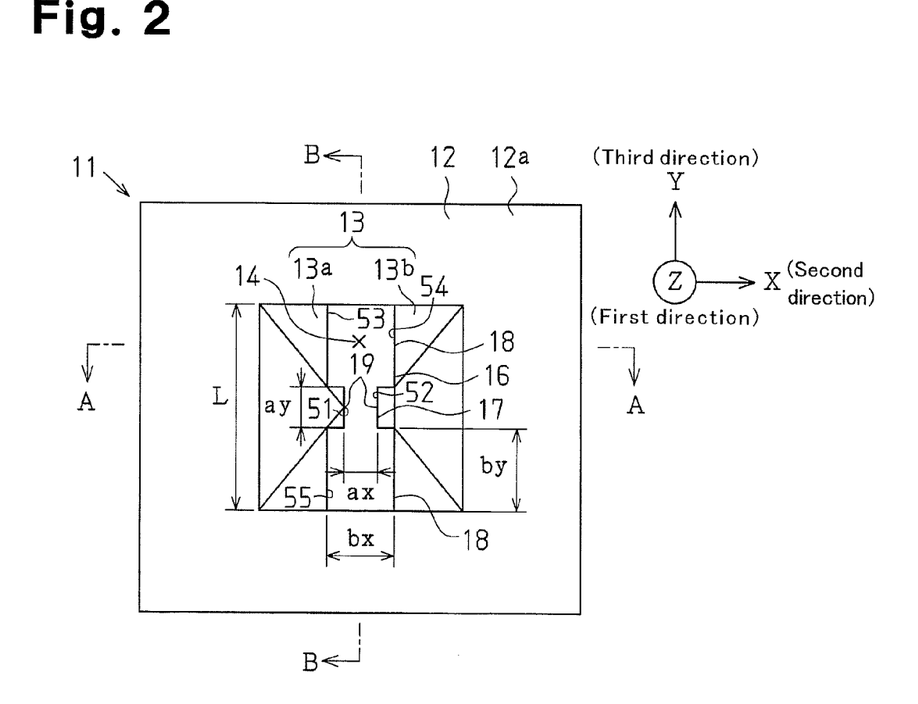
FIG. 2 is a fontal view showing the optical waveguide of FIG. 1

Hereinafter, an optical probe, which is a type of optical waveguide, according to a first embodiment of the present invention will be described with respect to FIGS. 1 to 8. As shown in FIG. 1, an optical waveguide (optical probe) 11 according to the present embodiment is equipped with a metallic main body 12 formed in a rectangular shape as viewed from front. A projection 13 formed in a substantially pyramid or conical shape (in a substantially rectangular pyramid shape in the present embodiment) is formed in a protrusive manner at a surface portion 12a of the main body 12. The main body 12 and projection 13 are composed of a dielectric medium that has a relative dielectric constant in which a real part is a negative value, i.e., a negative dielectric medium (plasmon active medium). In the present embodiment, there is illustrated a case in which a wavelength of light to be propagated, namely, a predetermined wavelength is 488 nm (hereinafter, referred to as the same case). As an example thereof, the main body 12 and the projection 13 are composed of silver (Ag) of which the value of the real part of the relative dielectric constant is −7.38. Namely, the relative dielectric constant of a dielectric medium is represented as a ratio of a dielectric of the medium to a vacuum dielectric constant.

Figure 3A:
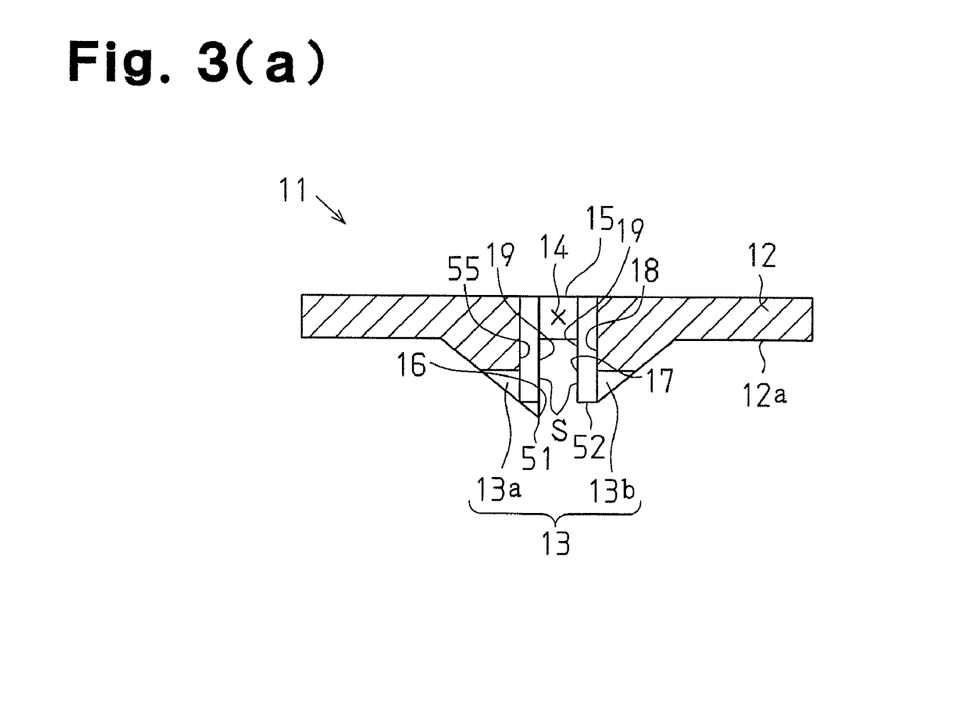
FIG. 3(a) is a cross-sectional view taken along line A-A of FIG. 2.
Figure 3B:
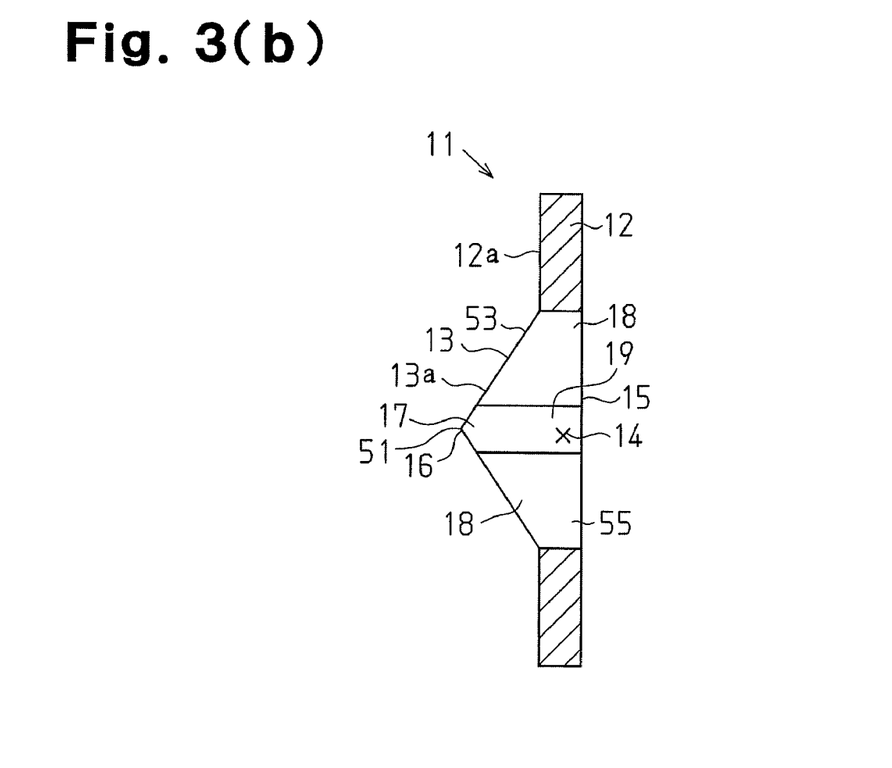
FIG. 3(b) is a cross-sectional view taken along line B-B of FIG. 2.

In addition, as shown in FIG. 1 and FIGS. 3(a) and 3(b), a distal end of the projection 13 is formed so as to be located at a substantial center of the surface portion 12a. At a portion of the main body 12 that corresponds to the projection 13, an optical waveguide path 14 for propagating light having the predetermined wavelength is formed to extend up to the surface of the projection 13 from a back face of the main body 12 so as to extend in a thickness direction of the main body 12 (a Z direction serving as a first direction). An internal surface of the main body 12 functions as a definition face 55 that defines the optical waveguide path 14. At a back face aperture 15 serving as a proximal end aperture of the optical waveguide path 14, an optical fiber F connected to a light source, although not shown, is connected to enable incidence of the light from light source into the optical waveguide path 14. This optical fiber F is publicly known as having a light containment type waveguide structure with a high refractive index medium being a core 42 (refer to FIG. 12(e)) and a low refractive index medium being a cladding 43. A core distal end 42a (refer to FIG. 12(e)) is connected to enable optical propagation to the back face aperture 15 of the optical waveguide path 14. It is preferable that a length of the optical waveguide path 14 be equal to or greater than at least a quarter of the wavelength of the light propagating in the optical waveguide path 14 in generating a surface plasmon on the definition face 55 of the optical waveguide path 14.

On the other hand, among the surfaces of the main body 12, on the surface of the projection 13, a fine aperture 16 of which a size of an internal face width measurement (dimensions in the X direction) serving as dimensions between a pair of internal faces opposed to each other is smaller than the wavelength of light is formed as a distal end aperture (end portion aperture) of the optical waveguide path 14. This fine aperture 16 is an outlet of the optical waveguide path 14, and allows the light having propagated through the optical waveguide path 14 to escape. With respect to this fine aperture 16, a cross-sectional shape (aperture shape in fine aperture 16) orthogonal to the propagation direction (a first direction that is a Z direction in FIGS. 1 and 2) of the light propagated via the optical waveguide path 14 is formed in a characterizing shape as described below.

This fine aperture 16 is formed in an aperture shape such that a narrow portion 17 located at a substantial center of the surface portion 12a and each of two wide portions 18 that are greater that the narrow portion 17 in internal face width measurement are alternately continuous. Namely, in the fine aperture 16, the narrow portion 17 and wide portions 18 are configured to form a shape such that, in the case where a polarizing direction of the light propagated via the optical waveguide path 14 (a second direction that is an x direction in FIGS. 1 and 2) is defined as a widthwise direction, these three portions are connected to each other alternately continuously in a direction orthogonal to the widthwise direction (a third direction that is a Y direction in FIGS. 1 and 2). The narrow portion 17 is located between both of the wide portions 18 with respect to the Y direction (third direction). While the size of the fine aperture 16 is actually very small in comparison with a size of the main body 12 (and its surface portion 12a), the fine aperture 16 is illustrated in a exaggerated manner in order to easily understand the characterizing aperture shape of the fine aperture 16 in FIG. 1 or the like.

In addition, an internal face width measurement "ax" (refer to FIG. 2) of the narrow portion 17 in the fine aperture 16 is set at a value that is smaller than a wavelength of the light propagated through the optical waveguide path 14 (488 nm in the present embodiment). In the present embodiment, the internal face width measurement "ax" is set at a value that is smaller than half the wavelength of the light (16 nm as an example). In other words, the definition face 55 serving as an internal face of the optical waveguide path 14 includes a pair of opposite face portions 19 that are portions corresponding to the narrow portion 17, and a gap between both of the opposite face portions 19 (a gap in the X direction) is the internal face width measurement "ax". On the definition face 55 of the optical waveguide path 14, at least both of the opposite face portions 19 are formed of a plasmon active substance (Ag). In the present embodiment, the whole definition face 55 of the optical waveguide path 14 is formed of Ag. With respect to the internal face width measurement "ax", a reason for setting such a condition is that, when an optical wave (electromagnetic wave) called a surface plasmon has been generated on the definition face 55 of the optical waveguide path 14 (in particular, at a pair of opposite face portions 19 opposite to each other in a widthwise direction (an x direction serving as a second direction) at the narrow portion 17 among the definition face 55), its electric field is strengthened and its phase velocity is retarded, whereby light is focused at the narrow portion 17. While the surface plasmon is also called a surface plasmon polariton, in general, this term will be described as a surface plasmon in the present specification.

In addition, in the fine aperture 16, a geometry L of the fine aperture 16 (refer to FIG. 2) in a direction (Y direction of FIGS. 1 and 2) in which the narrow portion 17 and wide portion 18 are continuous is set to 835 nm as an example. This geometry L is set at a value that is greater than a value obtained by dividing a phase velocity of the surface plasmon generated at the narrow portion 17 by a velocity in vacuum of the propagation light, and then multiplying the resultant by half the wavelength of the propagation light (hereinafter, referred to as a "geometry calculation value"). With respect to the geometry L, a reason for setting such a condition is that, in the case where the internal face width measurement "ax" of the narrow portion 17 has been set at a value that is smaller than half the wavelength of propagation light, if the geometry L is smaller than the geometry calculation value, it is possible that the propagation light cannot pass through the fine aperture 16. With respect to dimensions (refer to FIG. 2) of other sections of the definition face 55 in the fine aperture 16, a specific condition is not set in relationship with a wavelength of propagation light. In the present embodiment, as an example, the internal face dimensional length of "ay" the narrow portion 17 (Y-direction dimensions) is set to 31 nm; the internal face width measurement "bx" of each of the wide portions 18 is set to 47 nm; and the internal face dimensional length "by" of each of the wide portions 18 is set to 402 nm.

In the present embodiment, the optical waveguide path 14, as is understood from FIGS. 3(a) and 3(b), is formed all over the optical waveguide path 14, so that the shape of a cross section orthogonal to the optical propagation direction is identical to the aperture shape of the fine aperture 16. For example, a gap "ax" between both of the opposite face portions 19 is constant in arbitrary cross section orthogonal to the x direction (first direction). Therefore, the optical waveguide path 14 is composed of silver (Ag) all over the internal surface (the whole definition face 55) of the optical waveguide path 14 that includes the opposite face portions 19 in the narrow portion 17 and the narrow portion 17 is continuously formed from the fine aperture 16 to a back face aperture 15 all over the internal surface.

The fine aperture 16 opens at the projection 13 so that at least part of the narrow portion 17 is located at a distal end of the projection 13. The projection 13 includes: a first protrusive piece 13a (left side protrusive piece in FIG. 2) and a second protrusive piece 13b (right side protrusive piece in FIG. 2) opposed to each other while the optical waveguide path 14 is sandwiched therebetween. The fine aperture 16 has an aperture edge 53 formed at a first protrusive piece 13a and an aperture edge 54 formed at a second protrusive piece 13b so as to be opposed to each other in the X direction (second direction). A distal end 51 of the first protrusive piece 13a and a distal end 52 of the second protrusive piece 13b each correspond to a section corresponding to a distal end of the projection 13 of the aperture edges 53 and 54. The distal end 51 of the first protrusive piece 13a projects further than the distal end 52 of the second protrusive piece 13b in the Z direction in FIG. 2. That is, the distal end 51 of the first protrusive piece 13a and the distal end 52 of the second protrusive piece 13b are formed so as to be displaced with respect to the light propagation direction in the optical waveguide path 14 (Z direction serving as the first direction).

The displacement amount (distance) is defined as a distance of a value that is smaller than a wavelength of light (the predetermined wavelength) (refer to FIG. 3). In the present embodiment, the distal end 51 of the first protrusive piece 13a protrudes in the light propagation direction (Z direction in FIG. 2, namely, first direction) rather than the distal end 52 of the second protrusive piece 13b. The distal end 51 of the first protrusive piece 13a is pointed toward the Z direction, and the distal end 52 of the second protrusive piece 13b forms a plane perpendicular to the Z direction.

Now, a description will be given with respect to functions of an optical waveguide 11 according to the present embodiment. The following description will be given by way of example of a case of an illumination mode in which, in the case where light of a predetermined wavelength is incident from a back face aperture 15 into an optical waveguide path 14 of the optical waveguide 11, and spot light is seeped out from a fine aperture 16 that is a distal end aperture, specifically, irradiation of a near-field light and focusing light from a sample are carried out through the same aperture. In addition, with respect to the light of a predetermined wavelength incident into the optical waveguide path 14, a description will be given by way of example of a case in which the wavelength is 488 nm and a polarizing direction has been defined as a planar wave of linear polarization that is the X direction (second direction) in FIGS. 1 and 2.

When the light of the predetermined wavelength is made incident into the optical waveguide path 14 via an optical fiber F, the following phenomenon occurs in the optical waveguide path 14. That is, a main body 12 through which the optical waveguide path 14 is formed is made of silver (Ag) of which the value of the real part of the relative dielectric constant is $-7.38$, namely, a negative dielectric medium. Thus, this main body 12 behaves as a plasmon active substance rather than a conductor in an optical wave region. Therefore, on a definition face 55 of the optical waveguide path 14, vibration of an electric charge takes place due to induction of a surface electric charge, and then, there is generated an optical wave (electromagnetic wave) that is called a surface plasmon of which a propagation direction is along the definition face 55 (a first direction that is a Z direction of FIG. 2).

This surface plasmon is a surface wave that does not propagate in a direction perpendicular to an interface S (refer to FIG. 4) between the definition face 55 of the optical waveguide path 14 and air (dielectric) filling the optical waveguide path 14. Therefore, when this surface plasmon occurs, a magnetic field mainly parallel to the interface S (that is, the magnetic field mainly having a Y direction (third direction) component in FIGS. 1 and 2 at the narrow portion 17) is generated in the optical waveguide path 14, whereas an electric field mainly perpendicular to the interface S (that is, the electric field mainly having an X direction (second direction) component in FIGS. 1 and 2 at the narrow portion 17) is generated so as to be orthogonal to this magnetic field.

Figure 4:
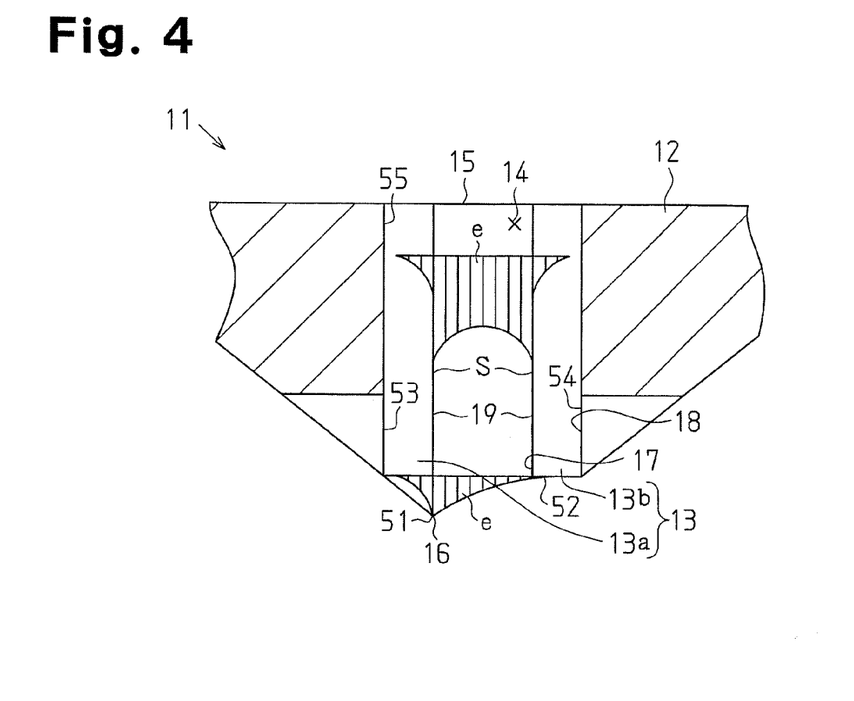
FIG. 4 is a schematic cross-sectional view showing essential portions, illustrating an electric field coupling of surface plasmon in the optical waveguide of FIG. 1.

In general, it is known that electric field intensity of a surface plasmon in a negative dielectric medium attenuates in an exponential function manner as the plasmon is distant from its surface (i.e., interface S). However, in the case of the present embodiment, on the definition face 55 of the optical waveguide path 14, at the narrow portion 17, the internal face width measurement "ax" of an opposite face portion 19 opposed thereto in a widthwise direction is set to 16 nm that is a very small gap. Therefore, as shown in FIG. 4, the electric fields of the surface plasmon(s), each of which has been generated on both of the interfaces S opposed to each other are coupled (added) with each other at the narrow portion 17. Therefore, due to the coupling of these electric fields, the electric field intensity of the surface plasmon becomes very strong at a portion of the narrow portion 17 in the optical waveguide path 14. This is deemed to be because a phenomenon similar to a so-called surface plasmon enhancement Raman scattering occurs at a portion of the narrow portion 17. As a result, in the optical waveguide path 14, in particular, at a portion at which there occurs coupling between electric fields of surface plasmon including a portion of the narrow portion 17, light intensity of the light propagated via the optical waveguide path 14 is increased. In FIG. 4, a sign "e" indicates an intensity distribution of an electric field.

In the meantime, the distal end 51 of the first protrusive piece 13a extends in the optical propagation direction from the distal end 52 of the second protrusive piece 13b. Therefore, the electric field intensity of the surface plasmon becomes the strongest at the opposite face portion 19 of the first protrusive piece 13a in the vicinity of the distal end 51 of the projection 13, and then, attenuates in an exponential function manner as it is distant from the opposite face portion 19 of the first protrusive piece 13a (refer to FIG. 4). As a result, the light intensity of the light propagated via the optical waveguide path 14 is increased in a region proximal to the first protrusive piece 13a in the vicinity of the distal end 51 of the projection 13.

In addition, for example, in order to enhance resolving power in a scanning near-field optical microscope or in order to increase recording density in an optical information recording apparatus, it is necessary to reduce the size of a spread distribution of the light that seeps out from the fine aperture 16 that is a distal end aperture of the optical waveguide path 14. Therefore, upon study of a relationship between a size of a phase velocity in the Z direction in FIGS. 1 and 2, of the surface plasmon, and a size of the internal face width measurement "ax" of the narrow portion in the optical waveguide path 14, a result as shown in FIG. 5 was obtained.

Figure 5:
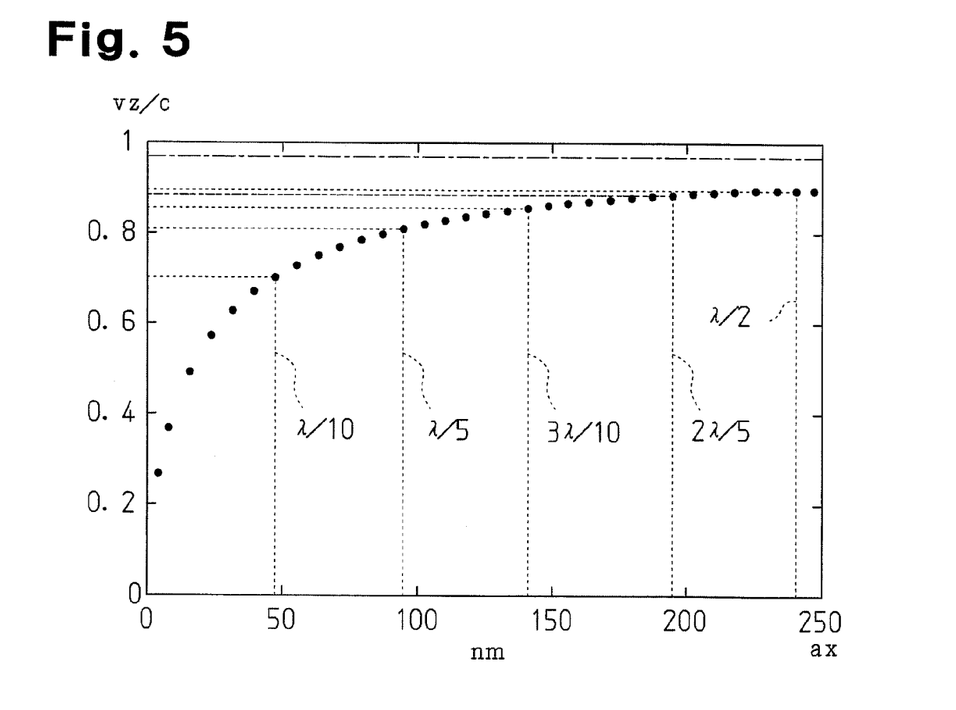
FIG. 5 is a diagram showing a correlation between a width measurement of a narrow portion and a phase velocity of surface plasmon in the optical waveguide of FIG. 1.

That is, in FIG. 5, the horizontal axis represents a size of the internal face width measurement "ax" of the narrow portion 17 in the optical waveguide path 14 (fine aperture 16), and its scaling numeric value is in units of nanometers (nm). The vertical axis represents a velocity ratio (vz/C) as a ratio of the phase velocity "vz" of surface plasmon passing through the narrow portion 17 to a light velocity C; and the scaling numeric value of the vertical axis indicates a value of the velocity ratio (vz/C) in the case where the velocity (light velocity C) in vacuum of propagation light is defined as "1". Therefore, this denotes that, the smaller the scaling numeric value of the velocity ratio (vz/C) in the vertical axis is, the slower the phase velocity "vz" of surface plasmon is.

In FIG. 5, each filled circle indicates a relationship between the internal face width measurement "ax" of the narrow portion 17 and the phase velocity "vz" of the surface plasmon, in the case where the whole definition face 55 of the optical waveguide path 14 is composed of silver (Ag) of which the value of a real part of the relative dielectric constant is −7.38 (in the case of the present embodiment). In addition, the single dotted chain line extending in a horizontal direction (transverse axis direction) from a slightly lower portion of the scaling numeric value "1" on the top of the vertical axis indicates a size of the velocity ratio (vz/C) in the case where a numeric value of the internal face width measurement "ax" is infinitive (∞).

As is understood from FIG. 5, the velocity ratio (vz/C) shows a tendency that the numeric value is gradually lowered as the internal face width measurement "ax" of the narrow portion 17 decreases. In addition, with respect to the lowering degree of the velocity ratio (vz/C), ax<2λ/5 (that is, ax≧195.2 nm) is greater than ax≧2λ/5 (that is, ax<195.2 nm) in the case where the internal face width measurement "ax"<λ/2 (that is, ax<244 nm). Similarly, with respect to the lowering degree of the velocity ratio (vz/C), ax<3λ/10 (that is, ax<146.4 nm) is greater than ax≧3λ/10 (that is, ax≧146.4 nm).

In particular, when the internal face width measurement ax<λ/5 (that is, ax<97.6 nm), further, the velocity ratio (vz/C) starts lowering in an accelerating manner. Then, when the internal face width measurement ax<λ/10 (that is, ax<48.8 nm), furthermore, the velocity ratio (vz/c) is lowered rapidly and greatly. In the case where the internal face width measurement "ax" is greater than half the wavelength λ (488 nm) of the propagation light, the width is close to the velocity ratio (vz/C) in the case where the internal face width measurement ax=∞, the width being indicated by the single dot chain line in FIG. 5.

Therefore, from the above fact, it is understood that the surface plasmon generated on the definition face 55 of the optical waveguide path 14 is significantly slow at its phase velocity of vz at a portion at which the surface plasmon is defined as the internal face width measurement "ax" (<244 nm) that is smaller than half the wavelength of the propagation light in the optical waveguide path 14, like the narrow portion 17 of the present embodiment. Then, the optical wave such as surface plasmon is prone to gather in a space in which the phase velocity "vz" is slow (small) in its propagation. Thus, the surface plasmon generated all over the definition face 55 including the narrow portion 17 and the wide portion 18 of the optical waveguide path 14 gathers at the narrow portion 17 set so as to have the internal face width measurement "ax" (<244 nm) that is smaller than half the wavelength of the propagation light so that its phase velocity "vz" is slow (small).

Therefore, even without depending on a method for strengthening a light source, in the optical waveguide 11 of the present embodiment, the electric field intensity of surface plasmon strengthens at the narrow portion 17, its phase velocity "vz" is slow, and then, the surface plasmon generated in the optical waveguide path 14 gathers. Thus, the intensity of the light propagated via the optical waveguide path 14 strengthens. Further, the light propagated via the optical waveguide path 14 is focused in the vicinity of the distal end 51 of a first protrusive piece 13a at the distal end 51 of a projection 13, based on the intensity distribution of an electric field at the periphery of the distal end 51 of the projection 13. Like these elements, the propagation light whose light intensity is thus increased, the light being focused, seeps out as spot light (near-field light) from the narrow portion 17 of the fine aperture 16; the spot light is scattered on a sample surface; and its scattered light is detected by means of an optical detector device having an external lens or the like, although not shown.

Figure 6A:
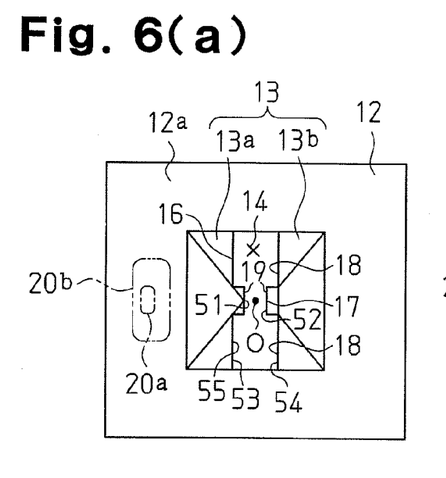
FIG. 6(a) is a front view showing the optical waveguide of FIG. 1.
Figure 6B:
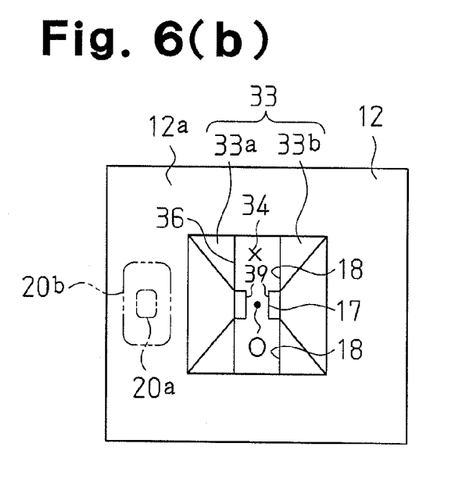
FIG. 6(b) is a front view showing a Comparative Example.

As a reference, with respect to an aperture shape of a fine aperture 16 formed at a surface portion 12a of a main body 12, the intensity of the light passing through each of the fine apertures was compared by Comparative Example having the aperture shape that is different from the fine aperture 16 of the present embodiment. FIG. 6(a) shows an example when a fine aperture 16 in the present embodiment is seen from its front side; and FIG. 6(b) shows an example when a fine aperture 36 of Comparative Example is seen from its front side, respectively. As is understood from the figures, a projection 33 of Comparative Example is formed so that a distal end of the first protrusive piece 33a (left side projection in FIG. 6(b)) and a distal end of the second protrusive piece 33b (right side in FIG. 6(b)) are not displaced from each other with respect to the light propagation direction. In addition, the fine aperture 36 is formed in the shape such that the sectional shape orthogonal to the propagation direction of the light is identical to the sectional shape orthogonal to the propagation direction of the light in the fine aperture 16 of the present embodiment (the gaps in the X direction are identical to each other). In both of the figures, at the left side of each fine aperture 16, the spread shape of a focusing region 20a representing a light distribution of spot light beams seeping out from the narrow portion 17 of each of the fine apertures 16 is displayed by the single dotted chain line as a reference. In addition, similarly, the spread shape of a faint light region 20b representing a light distribution of the peripheral light of the faint light that can be produced at the periphery of the respective focusing region 20a is displayed by the double dotted chain line as a reference.

Figure 7:
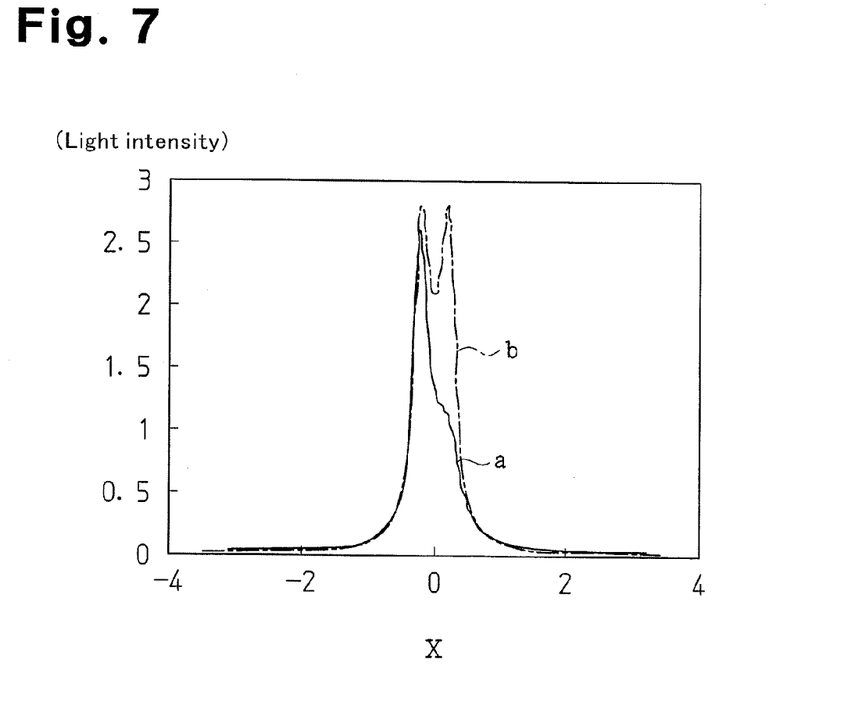
FIG. 7 is a diagram showing a light intensity distribution on a virtual plane in an X-axis direction of light having passed through the fine apertures of FIGS. 6(a) and 6(b)
Figure 8:
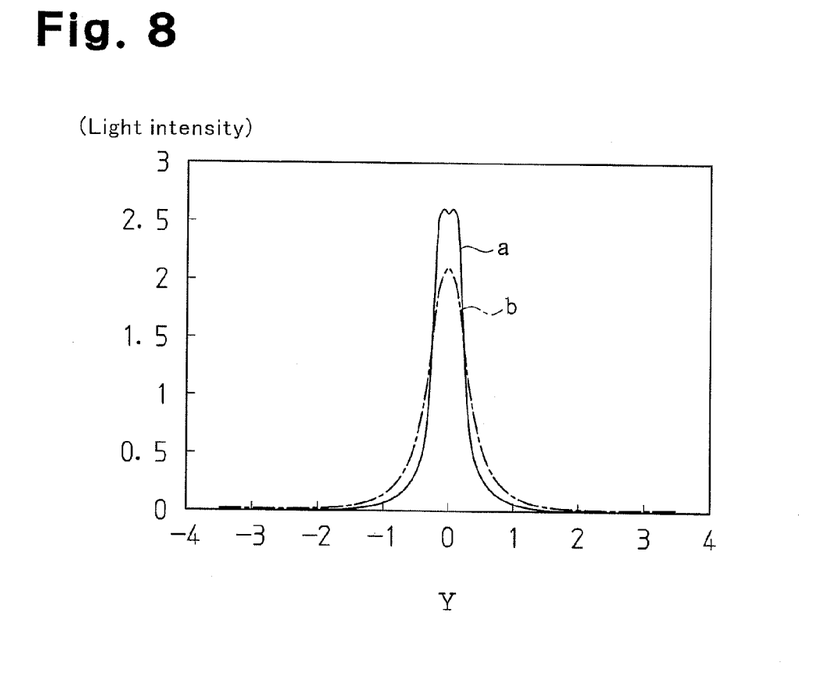
FIG. 8 is a diagram showing a light intensity distribution on a virtual plane in a Y-axis direction of light having passed through the fine apertures of FIGS. 6(a) and 6(b)

Therefore, in the case where light passes through each of the fine apertures 16 and 36 under the same condition, the intensity of the light on a virtual plane was checked, the light passing through a center O of each of the fine apertures 16 and 36. FIG. 7 shows intensity distributions of the light on the virtual plane passing the center O of each of the fine apertures 16 and 36 in the horizontal direction (X direction in FIG. 6). FIG. 8 shows intensity distributions of the light on the virtual plane passing the center O of each of the fine apertures 16 and 36 in the vertical direction (Y direction in FIG. 6). In FIGS. 7 and 8, a curve "a" indicates an intensity distribution curve of the light having passed through the fine aperture 16 of the present embodiment and a curve "b" indicates an intensity distribution curve having passed the fine aperture 36 of Comparative Example, respectively.

In the case of the fine aperture 16 in the present embodiment, as is evident from the distribution curve "a" shown in FIG. 7, very high light intensity focused at the side of a substantial extension direction of the distal end 51 in a first protrusive piece 13a was obtained in a transverse direction of the fine aperture 16. As described previously, the factors of this include the fact that the surface plasmons on both of the interfaces S opposed to each other in the narrow portion 17 are coupled with each other, whereby the electric field intensity is increased; and the fact that the distal end 51 of a first protrusive piece 13a and the distal end 52 of the second protrusive piece 13b are displaced with respect to the light propagation direction in the projection 13. In addition, as is evident from the distribution curve "a" shown in FIG. 8, very high light intensity was obtained in the vicinity of the center O of the fine aperture 16 in the vertical direction of the fine aperture 16. The factors of this include the fact that the phase velocity of the surface plasmon is slow (small) in the narrow portion 17, whereby the light propagating in the optical waveguide path 14 particularly focuses at a center of the narrow portion 17.

Now, referring to a case of a fine aperture 36 of Comparative Example, in the case of the fine aperture 36, as is evident from the distribution curve "b" shown in FIG. 7, in the transverse direction of the fine aperture 36, very high light intensity is obtained in the vicinity of the extension direction at each of the opposite face portions 39 of the first protrusive piece 33a and the second protrusive piece 33b. However, the light having passed through the fine aperture 36 of Comparative Example spreads with respect to the polarizing direction (X direction) of the light. The factors of this include the fact that a distal end of the first protrusive piece 33a and the distal end of the second protrusive piece 33b are not displaced with respect to the propagation direction of the light propagating in the optical waveguide path 34. In addition, as is evident from the distribution curve "b" shown in FIG. 8, in the longitudinal direction of the fine aperture 36, it is shown a light intensity distribution that a portion of the center O of the fine aperture 36 is defined as the maximum value. The factors of this include a factor similar to the case of the fine aperture 16 of the present embodiment described previously.

Therefore, the focusing region 20a of the light having seeped out from the fine aperture 16 of the present embodiment, as shown in FIGS. 6(a) and 6(b), narrows with respect to a polarizing direction (X direction), as compared with the focusing region 20a of the light having seeped out from the fine aperture 36 of Comparative Example. In addition, similarly, the faint light region 20b that can be produced at the periphery of the focusing region 20a of the light having seeped out from a fine aperture 16 of the present embodiment narrows with respect to a polarizing direction, as compared with the faint light region 20b that can be produced at the periphery of the focusing region 20a of the light having seeped out from the fine aperture 36 of Comparative Example. On the other hand, the focusing region 20a of the light having seeped out from the fine aperture 16 of the present embodiment and the faint light region 20b at the periphery of the focusing region 20a have spread that are substantially similar to the focusing region 20a of the light having seeped out from the fine aperture 36 of Comparative Example and the faint light region 20b at the periphery of the focusing region 20a, in a direction orthogonal to the polarizing direction (Y direction that is a vertical direction in FIGS. 6(a) and 6(b).

Therefore, an optical waveguide 11 of the present embodiment has the following advantages:

(1) When light is made incident to the optical waveguide path 14 extending through the main body 12 composed of silver (Ag) that is a plasmon active medium, a surface plasmon is generated on the definition face 55 that is an internal surface of the optical waveguide path 14 (including a fine aperture 16). Thus, the intensity of the light propagating the inside of the optical waveguide path 14 becomes strong as the light propagates toward the fine aperture 16. In addition, the distal end 51 of the first protrusive piece 13a is located so as to be more protrusive as compared with the distal end 52 of the second protrusive piece 13b (so as to be distant from the main body 12), and thus, at the periphery of the distal end of the projection 13, the light is focused in the vicinity of the first protrusive piece 13a based on an intensity distribution of the electric field at the periphery of the distal end. That is, the focusing region 20a of very high light intensity can be obtained to be very narrow with respect to a polarizing direction (X direction) of light. In addition, the optical waveguide 11 of the present embodiment is not an apertureless probe described in Patent Document 1 or the like. Thus, impairment of an S/N ratio and cost increase are avoided. Therefore, the light intensity of the light propagated via the optical waveguide path 14 is enhanced at a low cost while maintaining a good S/N ratio without causing an increase of spread of the light.

(2) The geometry L of an optical waveguide path 14 (fine aperture 16) in a direction (Y direction) in which the narrow portion 17 and the wide portion 18 of the optical waveguide path 14 (fine aperture 16) are continuous is set to be greater than a predetermined geometry calculation value. That is, the geometry L is set at a value that is greater than a value (geometry calculation value) obtained by dividing the phase velocity "vz" of the surface plasmon generated at the narrow portion 17 by the light velocity C that is a velocity in a vacuum of propagation light, and multiplying the resultant by half the wavelength of the propagation light. Therefore, the light made incident from an optical fiber F into the optical waveguide path 14 can reliably escape as spot light (such as near-field light) whose light intensity has been enhanced, without interruption, from the fine aperture 16 of the distal end of the optical waveguide path 14.

(3) The whole definition face 55 (whole internal face) of the optical waveguide path 14 is composed of silver (Ag) that is a plasmon active medium, as well as a portion of the definition face 55 in the vicinity of an aperture communicating with the fine aperture 16. Therefore, surface plasmon can be produced all over the definition face 55 of the optical waveguide path 14. Moreover, the narrow portion 17 is continuously formed from the fine aperture 16 at its distal end side to the back face aperture 15. Thus, the electric filed intensity improvement effect due to coupling of the surface plasmons on both of the interfaces S opposed to each other and the advantageous effect due to intensifying the light at the narrow portion 17 by retarding the phase velocity of the light propagated can be attained all over the definition face 55 of the optical waveguide path 14.

(4) In addition, in the present embodiment, silver (Ag) that is a negative dielectric medium is employed as a plasmon active medium. Thus, surface plasmon can be generated effectively and reliably. In addition, the optical waveguide path 14 is formed at the main body 12 made of a plasmon active medium (such as Ag), thereby facilitating manufacture of the optical waveguide 11.

(5) In addition, in the present embodiment, the fine aperture 16 provided at the distal end of the optical waveguide path 14 has the narrow portion 17 defined as the internal face width measurement "ax" of a value that is smaller than half the wavelength of propagation light. The optical waveguide 11 has a simple configuration that the definition face 55 of the optical waveguide path 14 that communicates with the narrow portion 17 is composed of a plasmon active medium. Therefore, this waveguide can be suitably used as an optical waveguide (optical probe) in a variety of optical processor apparatuses such as a scanning near-field optical microscope and an optical information recording apparatus.

Now, with reference to FIGS. 9 to 11, an optical probe that is a type of an optical waveguide according to a second embodiment of the present invention will be described. The second embodiment is different from the case of the first embodiment in terms of an aperture shape of a fine aperture 16 formed at a projection 13 of a surface portion 12a in the main body 12, and other constituent elements are configured in the same manner as those of the first embodiment. Therefore, constituent elements different from those of the first embodiment will be primarily described below. Like constituent elements of the first embodiment are designated by like reference numerals, and redundant description is omitted.

Figure 9:
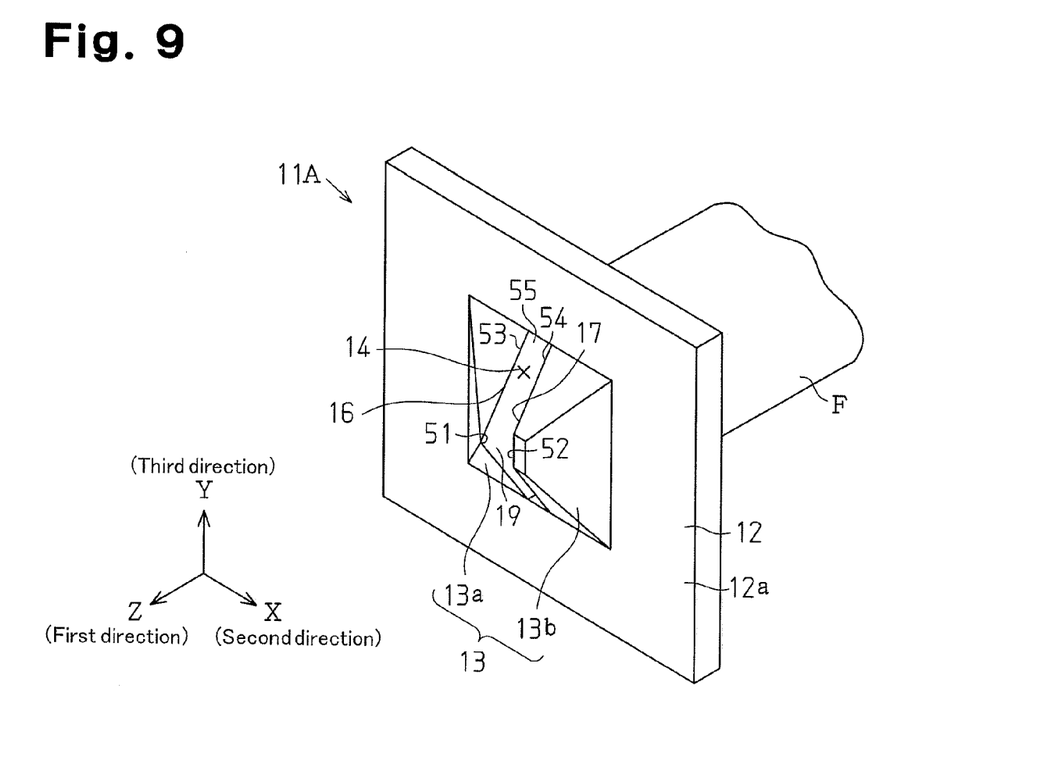
FIG. 9 is a perspective view showing a state in which an optical fiber is connected to an optical probe, which is an optical waveguide according to a second embodiment of the present invention.
Figure 10:
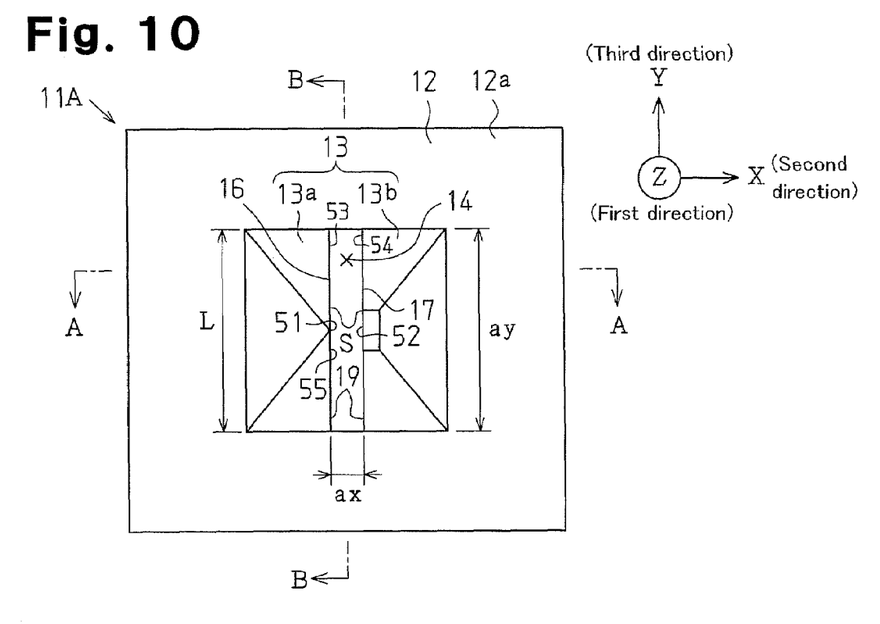
FIG. 10 is a front view showing the optical waveguide of FIG. 9.
Figures 11A, 11B:
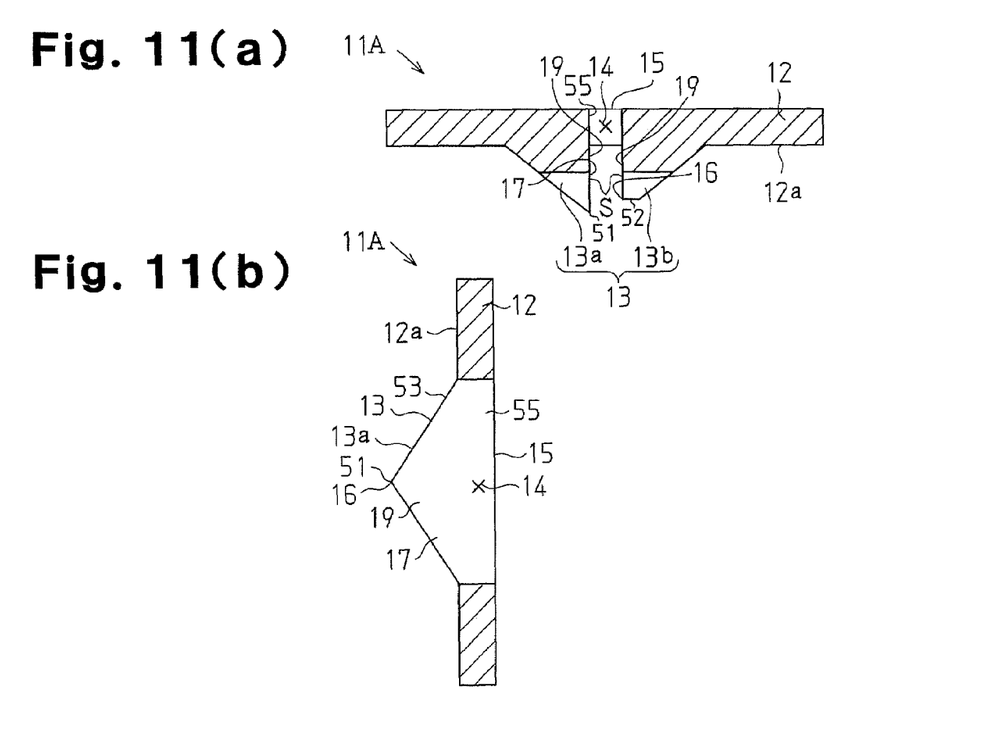
FIG. 11(a) is a cross-sectional view taken along line A-A of FIG. 10.
FIG. 11(b) is a cross-sectional view taken along line B-B of FIG. 10.

As shown in FIGS. 9 and 10, an optical waveguide (optical probe) 11A according to the present embodiment is equipped with a metallic main body 12 composed of silver (Ag) similar to the case of the first embodiment, and a projection 13 formed in a substantially pyramid or conical shape (formed in a substantial rectangular pyramid shape in the present embodiment) is formed in a protrusive manner at the surface portion 12a. This projection 13 is formed so that the distal end is located at a substantial center of the surface portion 12a, and then, at a location corresponding to the projection 13, an optical waveguide path 14 is formed through its thickness direction at the main body 12. Then, at a portion of the projection 13 in the surface portion 12a, a fine aperture 16 of which the size of the internal face width measurement is smaller than a wavelength of light is formed as an end aperture (distal end aperture) of the optical waveguide path 14 so as to divide the projection 13 into two equal portion, as viewed from the front face.

The fine aperture 16 serving as an outlet of the optical waveguide 11A according to the present embodiment, unlike the fine aperture 16 in the first embodiment, is formed in a rectangular shape such that the internal face width measurement of a transverse direction (X direction) is uniform over the entire definition face 55 of the fine aperture 16. That is, the fine aperture 16 is formed of only the narrow portion 17. As is the case with the first embodiment, the fine aperture 16 is configured so as to form a longitudinal rectangle shape extending in a direction orthogonal to its widthwise direction (Y direction in FIGS. 9 and 10) in the case where a polarizing direction (X direction in FIGS. 9 and 10) of the light propagated via the optical waveguide path 14 is defined as a widthwise direction. Then, aperture edges 53 and 54 of the fine aperture 16, as is the case with the first embodiment, are configured along a surface of the projection 13 in a propagation direction (Z direction shown in FIGS. 9 and 10) of the light propagating in the optical waveguide path 14. In addition, in the present embodiment as well, although the size of the fine aperture 16 is actually very small in comparison with the size of the main body 12 (and the surface portion 12a), in order to easily understand the characterizing aperture shape of the fine aperture 16 in FIG. 9 or the like, its size is illustrated in a more exaggerated manner than actually.

In addition, at the fine aperture 16 (narrow portion 17) in the present embodiment, its internal face width measurement "ax" is set at a value (16 nm) equal to the internal face width measurement "ax" (refer to FIG. 2) of the narrow portion 17 in the first embodiment. In addition, an internal face dimensional length "ay" of the fine aperture 16 is set at a value (835 nm) equal to total dimensions between the internal face dimensional length "ay" (refer to FIG. 10) of the narrow portion 17 in the first embodiment and an internal face dimensional length "by" (refer to FIG. 10) of each wide portion 18. That is, the geometry L of the fine aperture 16 of the present embodiment is obtained as a value (835 nm) equal to the geometry L (835 nm) of the fine aperture 16 of the first embodiment.

The projection 13 is spaced into a first protrusive piece 13a (left side projection in FIG. 10) and a second protrusive piece 13b (right side projection in FIG. 10) while the optical waveguide path 14 is sandwiched therebetween. A distal end 51 located in a front side of a Z direction in FIG. 10 of the first protrusive piece 13a and a distal end 52 of the second protrusive piece 13b are formed so as to be displaced from each other in the light propagation direction in the optical waveguide path 14, and the displacement amount (distance) is defined as the distance of a value smaller than a wavelength of light (refer to FIG. 11) In the present embodiment, the distal end 51 of the first protrusive piece 13a is located at the side of the light propagation direction rather than the distal end 52 of the second protrusive piece 13b.

Now, a description will be given with respect to functions of the optical waveguide 11A according to the present embodiment.

Light of a predetermined wavelength (light of a planar wave of linear polarization of which the wavelength is 488 nm and a polarizing direction is defined as an X direction in FIGS. 9 and 10, as is the case with the first embodiment) is made incident into the optical waveguide path 14 of the main body 12 via an optical fiber F, the following phenomenon occurs in the optical waveguide path 14. That is, an optical wave (electromagnetic wave) is generated such that a propagation direction is surface plasmon in a direction (Z direction in FIG. 9) taken along a definition face 55 of the optical waveguide path 14. Then, in this surface plasmon, its electric field intensity is very strong at the narrow portion 17 in the optical waveguide path 14 as a result of coupling electric fields with each other, of the surface plasmons generated on both of the interfaces S of the narrow portion 17. Therefore, the intensity of the light propagating in the optical waveguide path 14 becomes strong as the light propagates toward the fine aperture 16 based on the electric field intensity in the optical waveguide path 14.

In addition, the distal end 51 of the first protrusive piece 13a is located at the side of the optical propagation direction rather than the distal end 52 of the second protrusive piece 13b. In this manner, the electric field in the optical waveguide path 14 becomes strong in the vicinity of the first protrusive piece 13a at the distal end 51 of the projection 13, and then, weakens in an exponential function manner as it is distant toward the second protrusive piece 13b. Therefore, the light propagating in the optical waveguide path 14 seeps out from the fine aperture 16 in a state in which the light is focused in the vicinity of the first protrusive piece 13a, based on an intensity distribution of the electric field at the distal end 51 of the projection 13. Therefore, the light having seeped out from the optical waveguide 11A of the present embodiment, as is the case with the light having seeped out from the optical waveguide 11 of the first embodiment, is restricted from spreading in the polarizing direction (X direction) of its focusing region (not shown). In addition, the spread in the polarizing direction of a faint light region (not shown) that is produced at the periphery of this focusing region is also restricted.

Therefore, in addition to the advantages (1) to (5) in the optical waveguide 11 of the first embodiment, the optical waveguide 11A of the present embodiment has the following advantage.

(6) According to the present embodiment, when the optical waveguide path 14 communicating with the fine aperture 16 is formed with respect to the main body 12, there is no need for continuously forming a narrow portion 17 and a wide portion whose internal face width measurements are different from each other, and it is sufficient if the optical waveguide path 14 is formed such that the shape of a cross section orthogonal to the light propagation direction is formed in a longitudinally rectangular shape, thus, making it possible to contribute to reduction of manufacturing cost.

Each of the above embodiments may be modified as follows:

In each of the embodiments described above, the aperture shape of the fine aperture 16 may be formed in an aperture shape formed using a curve (for example, in a dumbbell shape). In addition, the aperture shape of the fine aperture 16 may be formed using a combination of straight lines and curves.

In the first embodiment described above, the narrow portion 17 may be provided in a location that is eccentric from the cross-sectional center of the optical waveguide path 14. In addition, in the optical waveguide path 14, as long as the internal face width measurement "ax" of the narrow portion 17 is set to be smaller than half the wavelength of propagation light, the dimensional ratio between the internal face width measurement "ax" of the narrow portion 17 and the internal face width measurement "bx" of the wide portion 18 may be much greater than that of these widths in the present embodiment. That is, the internal face width measurement "bx" of the wide portion 18 may be infinite dimensions as long as it meets a condition that it is greater than the internal face width measurement "ax" of the narrow portion 17.

In each of the embodiments described above, the optical waveguide path 14 may be an optical waveguide path formed as a cutout in a groove shape from a surface of the main body 12. In this case as well, there is a need for locating at least part of the narrow portion 17 in the fine aperture 16 at the distal end of the projection 13 provided at the main body 12.

In each of the embodiments described above, an optically transmittable medium such as a glass, for example, may fill the optical waveguide path 14.

In each of the embodiments described above, the optical waveguide path 14 may be an optical waveguide path formed so that the shape of a cross section orthogonal to its light propagation direction is different from the aperture shape of the fine aperture 16. For example, this optical waveguide path may be a tapered shaped optical waveguide path such that the sectional shape is smaller gradually as it approaches the fine aperture 16 at the distal end from the back face aperture 15, for example. In addition, this optical waveguide path may be an optical waveguide path such that the narrow portion 17 is formed only at the fine aperture 16 that is a distal end aperture of the optical waveguide path, and the narrow portion 17 is not formed at the back face aperture 15.

In each of the embodiments described above, the optical waveguide path 14 may be an optical waveguide path in which a back face aperture 15 is closed, and only a fine aperture 16 that is a distal end aperture is provided. In the case where the optical waveguide path has been thus configured, the propagation light incident from the fine aperture 16 located at an distal end into the optical waveguide path is reflected on a wall face of the internal depth of the optical waveguide path, a stationary wave is generated, and then, the generated wave escapes the fine aperture 16 located at a distal end again. Then, the escaped stationary wave is suitably utilized in the case of an illumination collection mode.

In each of the embodiments described above, the main body 12 and the projection 13 may be composed of gold (Au) or platinum and an alloy thereof, without being limited to silver (Ag) or alternatively, other metal materials or semiconductor materials and the like, as long as they are mediums of which the value of the real part of the relative dielectric constant becomes negative.

In each of the embodiments described above, in the main body 12, it is sufficient if a section of the opposite face portion 19 corresponding to the narrow portion 17 in at least the optical waveguide path 14 is composed of a plasmon active medium (silver Ag). Only the distal end 51 of the first protrusive piece 13a and the distal end 52 of the second protrusive piece 13b may be composed of a plasmon active substrate. In addition, only sections opposed to each other in the widthwise direction of the narrow portion 17 formed all over the definition face 55 of the optical waveguide path 14 from the fine aperture 16 up to the back face aperture 15 may be composed of a plasmon active medium (silver Ag). In addition, the plasmon active medium (such as silver Ag) may be evaporated onto the definition face 55 of the optical waveguide path 14 including the opposite face portion 19 or the like of the narrow portion 17.

For example, metal coating may be evaporated onto a silicon substrate, whereby the optical waveguide 11A may be manufactured. With reference to FIGS. 12(a) to 12(e), a description will be given with respect to a process for manufacturing the optical waveguide 11A shown in FIG. 9. A detailed description will be given with respect to a process for manufacturing the optical waveguide 11A in accordance with focusing ion beam processing (FIB processing), and then, mounting the manufactured optical waveguide 11A on a distal end of an optical fiber F (core distal end 42a).

Figure 12A:
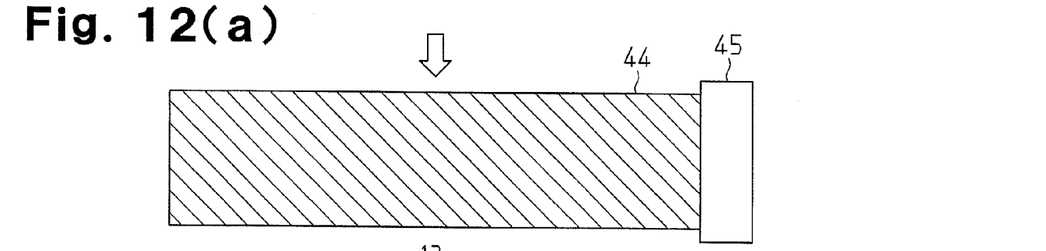
FIGS. 12(a) to 12(e) are illustrative views showing a process for manufacturing the optical waveguide of FIG. 9.
Figure 12B:
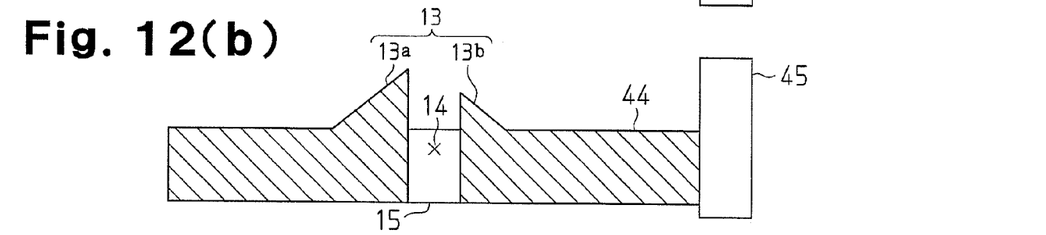
Figure 12C:
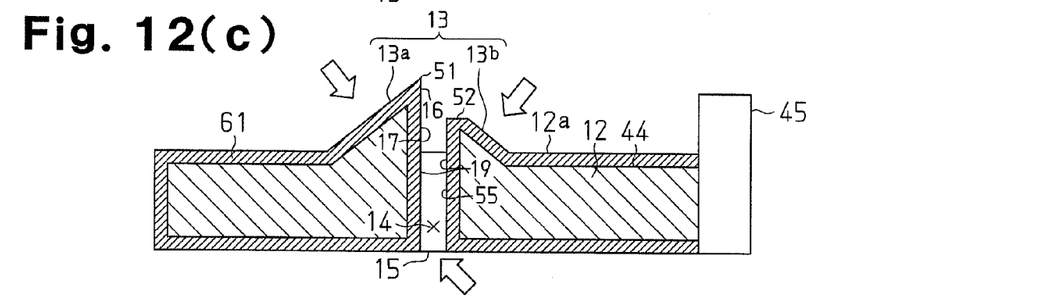
Figure 12D:
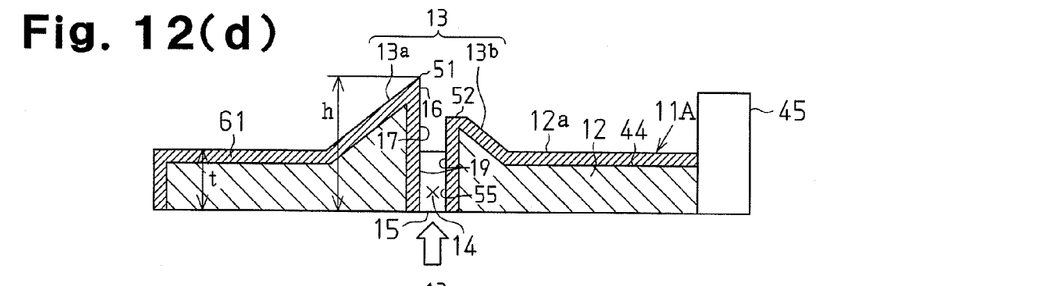
Figure 12E:
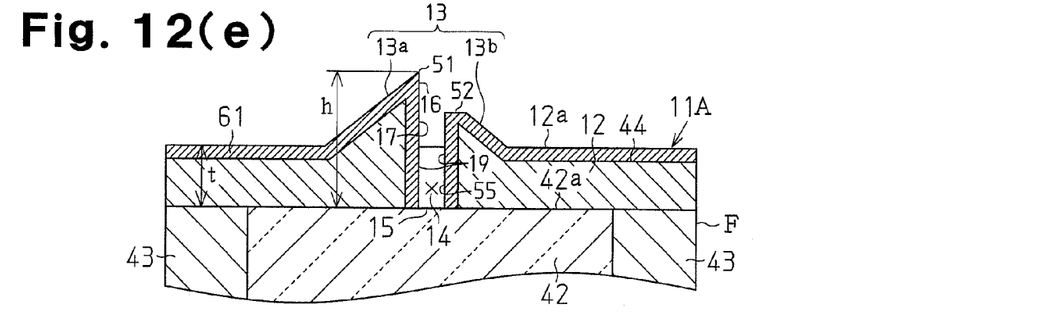

First, as shown in FIG. 12(a), a silicon substrate 44 that can be precisely processed in accordance with FIB processing is provided, and this silicon substrate 44 is supported by means of a support portion 45. Then, FIB processing is applied to a surface (top face in FIG. 12(a)) of the silicon substrate 44, thereby producing a first protrusive piece 13a, a second protrusive piece 13b, and an optical waveguide path 14, as shown in FIG. 12(b). Then, as shown in FIG. 12(c), through sputtering, silver is evaporated onto the silicon substrate 44, and then, silver coating 61 is produced. The thickness of the silver coating 61 is set to be equal to or greater than 30 nm, for example. Then, as shown in FIG. 12(d), FIB processing is applied to the back face (bottom face in FIG. 12(d)) of the silicon substrate 44, thereby adjusting the thickness of the silicon substrate 44, namely, a thickness "t" of the main body 12. In this manner, the length of the optical waveguide path 14 is adjusted. The thickness "t" of the main body 12 is set to 90 nm, for example. A dimension "h" from the back face of the optical waveguide 11A to the distal end 51 of the first protrusive piece 13a (=the height of the first protrusive piece 13a+ the thickness "t" of the main body 12, namely, the length of the optical waveguide path 14) is set to 190 nm, for example. This dimension "h" is equivalent to the length of the optical waveguide path 14. The thus manufactured optical waveguide 11A is mounted on a core distal end 42a of an optical fiber F, as shown in FIG. 12(e). The process is completed isolating the support portion 45 from the optical waveguide 11A.

In the process described above, before mounting the optical waveguide 11A on the core distal end 42a of the optical fiber F, the thickness "t" of the main body 12 is adjusted. In the process for manufacturing the optical waveguide 11A, as in another manufacturing process shown in FIGS. 13(a) to 13(d), the thickness "t" of the main body 12 may be adjusted on the core distal end 42a of the optical fiber F.

Figure 13A:
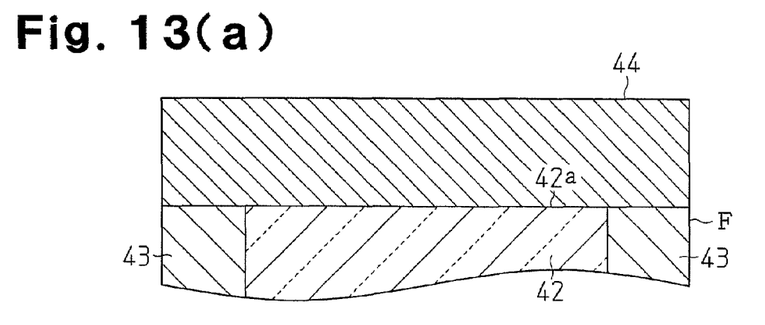
FIGS. 13(a) to 13(d) are illustrative views showing another process for manufacturing the optical waveguide of FIG. 9.
Figure 13B:
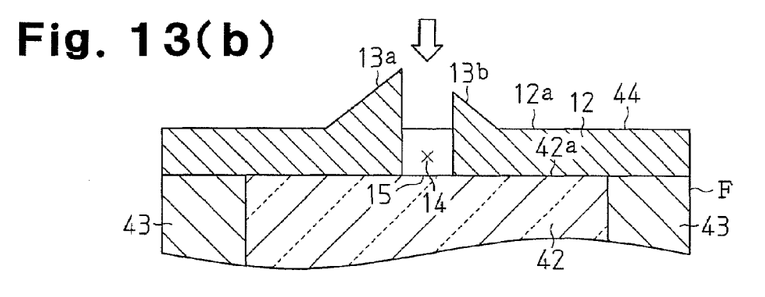
Figure 13C:
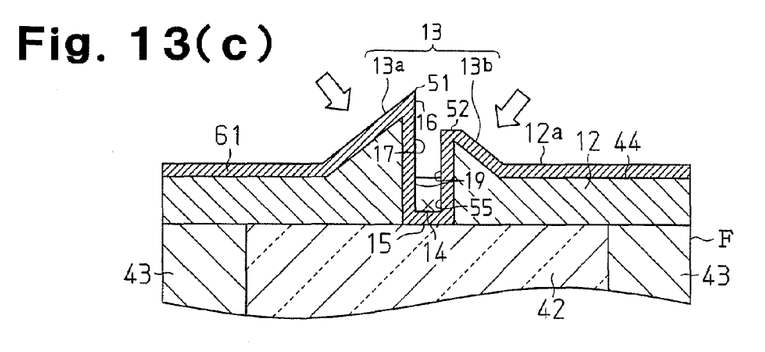
Figure 13D:
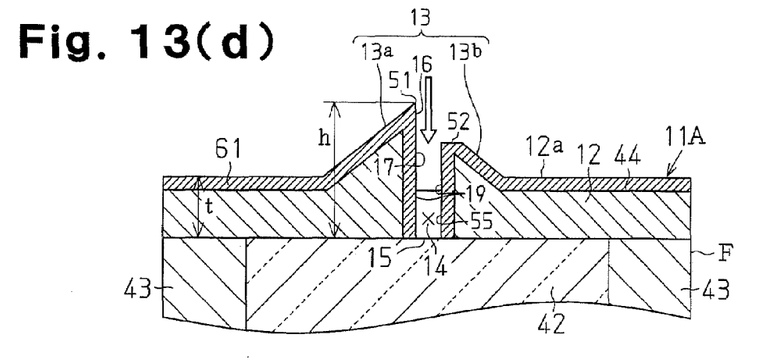

Specifically, first, as shown in FIG. 13(a), the silicon substrate 44 is mounted on the core distal end 42a of the optical fiber F. Next, as shown in FIG. 13(b), on the core distal end 42a, FIB processing is applied to a surface of the silicon substrate 44, thereby producing a first protrusive piece 13a, a second protrusive piece 13b, and an optical waveguide path 14. At this time, the thickness of the silicon substrate 44 is adjusted in accordance with FIB processing. Next, as shown in FIG. 13(c), through sputtering, silver is evaporated onto the silicon substrate 44, and silver coating 61 is produced. At this time, the silver coating 61 closes the back face aperture 15 of the optical waveguide path 14. Then, as shown in FIG. 14(d), in accordance with FIB processing, a portion of the silver coating 61 closing the back face aperture 15 is removed, and the process is completed.

In the method for manufacturing the optical waveguide 11A, the optical waveguide 11A may be manufactured through, for example, an electron-beam nano-lithography technique or an ion beam deposition technique, without being limited to FIB processing. Namely, the method for manufacturing the optical waveguide 11A having a portion finer than the wavelength of light (visible light) may be carried out using ions or electrons.

In each of the embodiments described above, the internal face width measurement "ax" of the narrow portion 17 in the fine aperture 16 is not limited to a dimensional value of each of the embodiments described above as long as it is set to be dimensionally smaller than half the wavelength of propagation light. In addition, the geometry L of the direction (Y direction) crossing the widthwise direction (X direction) in the fine aperture 16 is also not limited to the geometries of the values presented in the embodiments, and the geometry L may be greater than half the wavelength of propagation light as long as it is set at a value greater than the geometry calculation value.

The displacement amount (distance) in the light propagation direction in the optical waveguide path 14 (Z direction serving as first direction) between the distal end 51 of the first protrusive piece 13a and the distal end 52 of the second protrusive piece 13b is not limited to the distance that is smaller than the wavelength of light (the predetermined wavelength). The displacement amount may be greater than the wavelength of light as long as it has an advantage that the light having passed through the optical waveguide path 14 is focused in the vicinity of the distal end 51 of the first protrusive piece 13a.

In each of the embodiments described above, a projection 13 may be formed in a substantially pyramid or conical shape, and may be a projection formed in an arbitrary shape such as a conical shape, for example.

What is claimed is:

1. An optical waveguide, comprising:
   a main body having an optical waveguide path capable of propagating light having a predetermined wavelength along a first direction orthogonal to a second direction and a third direction that are orthogonal to each other, the light being polarized to the second direction, the optical waveguide path having an outlet allowing the light to escape, the outlet having a narrow portion of which the width relative to the second direction is smaller than the wavelength of the light;
   a definition face for defining the optical waveguide path, the definition face including a pair of opposite face portions opposed to each other in the second direction, each opposite face portion being formed of a plasmon active substance at least in a portion that corresponds to the narrow portion; and
   a projection formed in a substantially pyramidal or conical shape provided at the main body, the outlet opening in the projection so that at least part of the narrow portion is located at a distal end of the projection, the outlet having a pair of aperture edges being opposed to each other in the second direction, the aperture edges being displaced from each other by a distance that is smaller than the wavelength of the light with respect to the first direction in a portion corresponding to the distal end of the projection;
   wherein the projection includes a pair of protrusive pieces that are opposed to each other with the outlet in between, and wherein distal ends of the protrusive pieces are displaced from each other with respect to the first direction.

2. The optical waveguide according to claim 1, wherein the outlet has a wide portion of which the width with respect to the second direction is greater than that of the narrow portion, and wherein the narrow portion and the wide portion are continuous along the third direction.

3. The optical waveguide according to claim 1, wherein the outlet has a pair of wide portions of which the width with respect to the second direction is greater than that of the narrow portion, and wherein the narrow portion is located between both of the wide portions with respect to the third direction.

4. The optical waveguide according to claim 1, wherein the narrow portion is one of a pair of narrow portions being opposed to each other in the second direction, wherein the width of both of the narrow portions is smaller than half the wavelength of the light, and wherein a dimension of the outlet with respect to the third direction is greater than a predetermined value, and wherein the predetermined value is a value obtained by dividing a phase velocity of surface plasmon generated at the narrow portion when light propagates in the optical waveguide path by a velocity in vacuum of the light, and further, multiplying the resultant value by half the wavelength of the light.

5. The optical waveguide according to claim 1, wherein the plasmon active medium is a dielectric medium having a relative dielectric constant with a negative real part.

6. The optical waveguide according to claim 1, wherein a gap between the opposite face portions is constant at an arbitrary cross section that is orthogonal to the first direction.

7. The optical waveguide according to claim 1, wherein the whole definition face is composed of a plasmon active substance.

8. The optical waveguide according to claim 1, wherein the distal ends of the protrusive pieces are displaced from each other by a distance that is smaller than the wavelength of the light with respect to the first direction.

9. The optical waveguide according to claim 1, wherein the distal end of one of the protrusive pieces is pointed toward the first direction, and the distal end of the other protrusive piece forms a plane perpendicular to the first direction.

* * * * *